(12) United States Patent
Celada-Gonzalez et al.

(10) Patent No.: US 6,290,434 B1
(45) Date of Patent: Sep. 18, 2001

(54) EXPANSION JOINT FOR HIGH-PRESSURE HIGH-TEMPERATURE PNEUMATIC TRANSPORT OF DRI OR OTHER ABRASIVE PARTICLES

(75) Inventors: Juan Celada-Gonzalez; Marco Aurelio Flores-Verdugo; Ronald Victor Manuel Lopez-Gomez; Rolando Montemayor-Silva; Alberto Diego Soriano-Gutierrez, all of Nuevo Leon (MX)

(73) Assignee: Hylsa, S.A. de C.V., San Nicolas de los Garza (MX)

( * ) Notice: Subject to any disclaimer, the term of this patent is extended or adjusted under 35 U.S.C. 154(b) by 0 days.

(21) Appl. No.: 09/474,856

(22) Filed: Dec. 30, 1999

(51) Int. Cl.⁷ .................................................. B65G 53/00
(52) U.S. Cl. ......................... 406/197; 406/193; 406/198
(58) Field of Search .................................. 406/191, 193, 406/196, 197, 198

(56) References Cited

U.S. PATENT DOCUMENTS

| | | | |
|---|---|---|---|
| 3,884,528 | * 5/1975 | Shaddock | 302/58 |
| 4,993,887 | * 2/1991 | Schulze | 406/193 |
| 4,995,645 | * 2/1991 | Pausch | 406/193 |
| 5,310,291 | * 5/1994 | Miller et al. | 406/193 |

* cited by examiner

Primary Examiner—Christopher P. Ellis
Assistant Examiner—Joe Dillon, Jr.
(74) Attorney, Agent, or Firm—A. Thomas; S. Safford; Frommer Lawrence & Haug LLP

(57) ABSTRACT

Method and apparatus for pneumatically transporting solid and abrasive particulate materials at high temperature, by means of a carrier gas through a plurality of co-axial straight pipes. The pipes are maintained under constant tension by applying a force across at least one expansion joint coupling said pipes in order to maintain said pipes straight against the forces acting on said pipes which tend to cause bending and deformation thereof, as for example: thermal elongation, the weight of the solids conveyed through said pipes, the friction forces between said pipes and its supporting frame, and the pressure of the carrier gas inside said pipes. The constant tensioning force may be applied for example, by means of hydraulic cylinders in combination with a telescopic water-cooled sleeve.

14 Claims, 3 Drawing Sheets

EXPANSION JOINT FOR HIGH-PRESSURE HIGH-TEMPERATURE PNEUMATIC TRANSPORT OF DRI OR OTHER ABRASIVE PARTICLES

FIELD OF THE INVENTION

The present invention relates to a method and an apparatus for transporting solid materials pneumatically at high temperature, especially relatively large friable particles of an abrasive nature (such as sponge iron, more typically known as direct reduced iron, or DRI, particles). In particular, this invention provides method and apparatus for maintaining the pneumatic transport pipelines for such apparatus straight even under high-temperature and high-pressure. This invention is especially useful in the method and apparatus of applicants' assignees' U.S. Pat. Nos. 5,296,015 and 5,445,363 (which together with all other patents cited below are incorporated herein by reference).

BACKGROUND OF THE INVENTION

In every system dedicated to the pneumatic transport of abrasive solid particles, a significant problem to be solved concerns the excessive wear of the pipelines. This is particularly true of large capacity high-temperature high-pressure systems. In order to avoid excessive wear, the lines must be straight (with any redirection, such as between vertical and horizontal, requiring specialized elbows). Any bend or deviation of the straight pipeline portions produces a point prone to abrasion and thus subject to rapid erosion through the wall of the pipeline. This is a particular problem where the carrier gas is flammable or a potential health concern, such as carbon monoxide.

When the pipeline is required to be straight and the system must also be operated under pressure and at high-temperature, the expansion of the pipes poses a further particularly difficult problem.

Many commercial solutions to compensate for the expansion of pipe lines show expansion joints that allow changes of position and usually are specified for non-solid fluids only, that is without entrained solids, at mid-range temperatures. These do not have the abrasion problems that solids transport present.

The prior art shows several embodiments related to coupling pipes at high-pressure which mainly compensate for the separative forces caused by the internal pressure, while others are related to systems allowing for movement between coupled pipelines.

U.S. Pat. No. 4,317,586 to Campbell shows a pressure-compensating pipe joint for pressure-variable fluid transport. The joint includes a sleeve 22 telescopically mated with and between the ends 12 and 13 of two conjoined pipes. The internal pressure within the pipes tending to separate the telescopic joint is compensated for by applying the same internal pressure on an equivalent area on piston heads in external cylinders acting between the conjoined pipe ends in a direction opposing separation. However, there is no teaching to tension the aligned pipes by a compensating force in excess of the separating force at the expansion joint. Also disclosed in this patent, is the capability of the joint to articulate and to permit relative movement of one pipe with respect to the other, including internal on rotational movement. This disclosure and embodiment is both insufficient and inappropriate to pneumatic transport of abrasive materials (where bending or alignment deviations of the pipes must be avoided). Another difference between U.S. Pat. No. 4,317,586 and the present invention is that when the fluid contained in the pipe further includes solid particles, any cavities in the articulating means should be avoided in order to reduce abrasion and jambing accumulation of the transported particles in said cavities.

U.S. Pat. No. 4,635,533 to Whiteside-II describes an expansion joint (used in petroleum FCC units for handling high temperature catalyst particles) to limit or counterbalance the separation of the joint under increasing pressure and/or to permit compensating contraction of a bellows coupling under increasing temperature. This system shows an embodiment that senses strain at an elbow in the piping to apply independent fluid pressure as a counter-thrust into the bellows at the adjacent pipe joint. This teaching is directed to compensate for the changes caused by the operating pressure and/or thermal expansion. Furthermore this compensating system described by Whiteside-II is used to maintain pipes and elbows with no strain no matter whether their temperature is high or low. Thus there is a teaching of compressing the joint 22 of the offset stain (by action of the structure 64 on rods 86), but no teaching of tensioning the pipes 26 or 32.

U.S. Pat. No. 2,545,701 to McCausland shows a compensated expansion joint directed to counteract the thrust forces caused by the internal pressure. This is very similar to the Campbell patent and is distinguishable for many of the same reasons. McCausland teaches that the expansion joint can be either slip-joint or corrugated bellows-type. Even though it is applicable for conveying fluids through the pipes and expansion joints, it does not suitably apply to the pneumatic transport of solid particles. When the thermal expansion is the main concern, it is desired that the longitudinal changes be freely compensated by means of the expansion joint. If solid particles are conveyed by the fluid circulating through the pipes, said particles will "see" a low velocity zone at the bellows thus settling on them, and resulting in additional resistance to the expansion or contraction of the joint.

Also of general background interest are U.S. Pat. No. 2,314,776 to Dittus et al.; U.S. Pat. No. 2,348,833 to Miller; U.S. Pat. No. 2,373,280 to Weber; U.S. Pat. No. 3,458,219 to Wesch; U.S. Pat. No. 4,146,253 to Celommi; U.S. Pat. No. 4,475,750 to Campbell; U.S. Pat. No. 4,482,171 to Campbell; U.S. Pat. No. 4,615,542 to Ideno et al.; and, U.S. Pat. No. 5,116,085 to Carrel. None of the above prior art however discloses the combination of features and advantages of the present invention.

OBJECTS OF THE INVENTION

It is an object of the present invention to provide a method and apparatus for maintaining the pipelines of a pneumatic transport straight even if the internal pressure and/or the temperature of said pipelines changes significantly.

It is another object of the invention to provide a method and an apparatus for absorbing the longitudinal changes produced by the thermal expansion of the pipelines even though the temperature of said pipelines increases drastically.

It is another object of the invention to provide a method and apparatus able to pneumatically transport abrasive solid particles at high temperature.

The objects of the present invention are generally achieved by providing a process and apparatus by uniquely focusing on maintaining a pipeline under sufficient tension in order to assure its straightness (regardless of thermal expansion, friction on its supporting elements, friction on the expansion joints, high temperature and/or the internal pressure).

SUMMARY OF THE INVENTION

When a pipeline is operated under high internal pressure and it requires at least one expansion joint due to temperature fluctuations, it is well known that the thrust forces actuating on the ends of each pipe tend to separate said ends thus requiring compensating forces. It is also well known to use pistons, bellows or counterweights in order to provide the necessary counter-thrust forces required. However, a further problem beyond mere separation at a given joint arises when the pipeline is suspended or supported, and its length is large, such that the thermal expansion will extend through the overall length of the pipe up to its anchored ends. The supports at such ends will provide a resistance that even though it may be low, is enough to bend or buckle the pipe. When only fluid is conducted through the pipe, some such bowing can be accommodated without further problems, but when highly abrasive material is transported, any bow, bend, or buckle will promote the rapid erosion of the internal surface of the pipes.

Even though the present invention is directed to the pneumatic transport of solid particles (such as iron containing material, and more specifically to the transport of direct reduced iron (DRI) particles), the invention in its broader aspects can be used in pneumatic transport systems for other similar materials.

In the specific illustrative embodiment, the DRI is transported at a temperature above 100° C., preferably above 600° C. and more preferably above 800° C. The pressure of operation for the transport of DRI particles can be in the range from 2 Kg/cm$^2$ up to 14 Kg/cm$^2$ without requiring substantial changes in the structure of the system. As will be obvious for those skilled in the art, the carrier gas for the transport of DRI particles is preferably a non-oxidizing gas and more preferably a reducing gas (because this type of gas is readily available when the pneumatic transport is installed in a direct reduction plant).

Another problem posed by a pneumatic transport system in the preferred embodiment is that the expansion joint must be effectively sealed to prevent highly flammable reducing gas (largely comprised of hydrogen and carbon monoxide) from leaking to the outer atmosphere. Therefore, it is necessary to prevent damage caused by solid particles that can get into and erode the joint seals. The seal required to withstand such high pressures and temperature causes a friction that will oppose to the free sliding of the telescopic expansion joint needed to accommodate thermal expansion, and thus such increased friction can be a cause to bend and even buckle the pipeline. Another force acting on the pipeline, which tends to bend or cause deformation of the pipes are the weight of the solids conveyed through said pipes.

In order to accomplish the objects of the invention regardless of all these problems, the applicants have found that it is necessary to maintain the pipelines under a significant tension when the pneumatic system is operated. To achieve this, the pipelines must be maintained straight between any two points of predetermined change of direction, where both points anchor the ends of the straight portion of pipeline. To prevent costly heat loss, the pipeline is preferably made up of a plurality of co-axial pipes with insulation between the inner and outer pipes. This further complicates the structure of the expansion joints. At least one expansion joint is provided between said two anchoring points capable of handling the full thermal expansion of the pipeline between said both points and also of providing a contracting force across the joint that maintains the pipeline between said two points under a predetermined tension. The tension to be applied must be higher or equal than the total of the friction forces posed by the supporting means, the friction posed by the tightness of the seals of the expansion joint, and the forces caused by the internal pressure of the system, namely, the pressure of the carrier gas.

Another characteristic of the invention addresses the problem that currently available sealing means cannot support high temperatures without rapid degradation of their properties. To handle this problem, the expansion joint proposed to achieve the advantages of the present invention is supplied with a cooling jacket to maintain a reasonable low temperature on the surfaces contacting the sealing means.

When the thermal expansion is such that it will be difficult to handle with only one expansion joint, two or more expansion joints can be used to maintain the tension between the above-mentioned two anchor points and handle the longitudinal changes.

The present invention thus provides method and apparatus for the pneumatic transport of solid particles at high temperatures through a plurality of straight, preferably insulated and co-axial, pipes by conveying a particulate solid material from a first point to a second point by a carrier gas, maintaining said pipes under constant tension by applying a force across at least one expansion joint coupling said pipes and anchoring the opposite ends of said pipes, said tension being in magnitude at least equal to the thrust forces acting on said pipes caused by the pressure of said carrier gas plus any other friction forces opposed to the free thermal expansion of said pipes.

DETAILED DESCRIPTION OF PREFERRED EMBODIMENTS OF THE INVENTION

In this specification and the accompanying drawings, some preferred embodiments of the invention are shown and described, and various alternatives and modifications thereof have been suggested. It is to be understood that these are not intended to be exhaustive and that many other changes and modifications can be made within the scope of the invention.

The suggestions herein are selected and included for purposes of illustration in order that others skilled in the art will more fully understand the invention and the principles thereof and will thus be enabled to modify it in a variety of forms, each as may be best suited to the conditions of a particular use.

Figure 1:
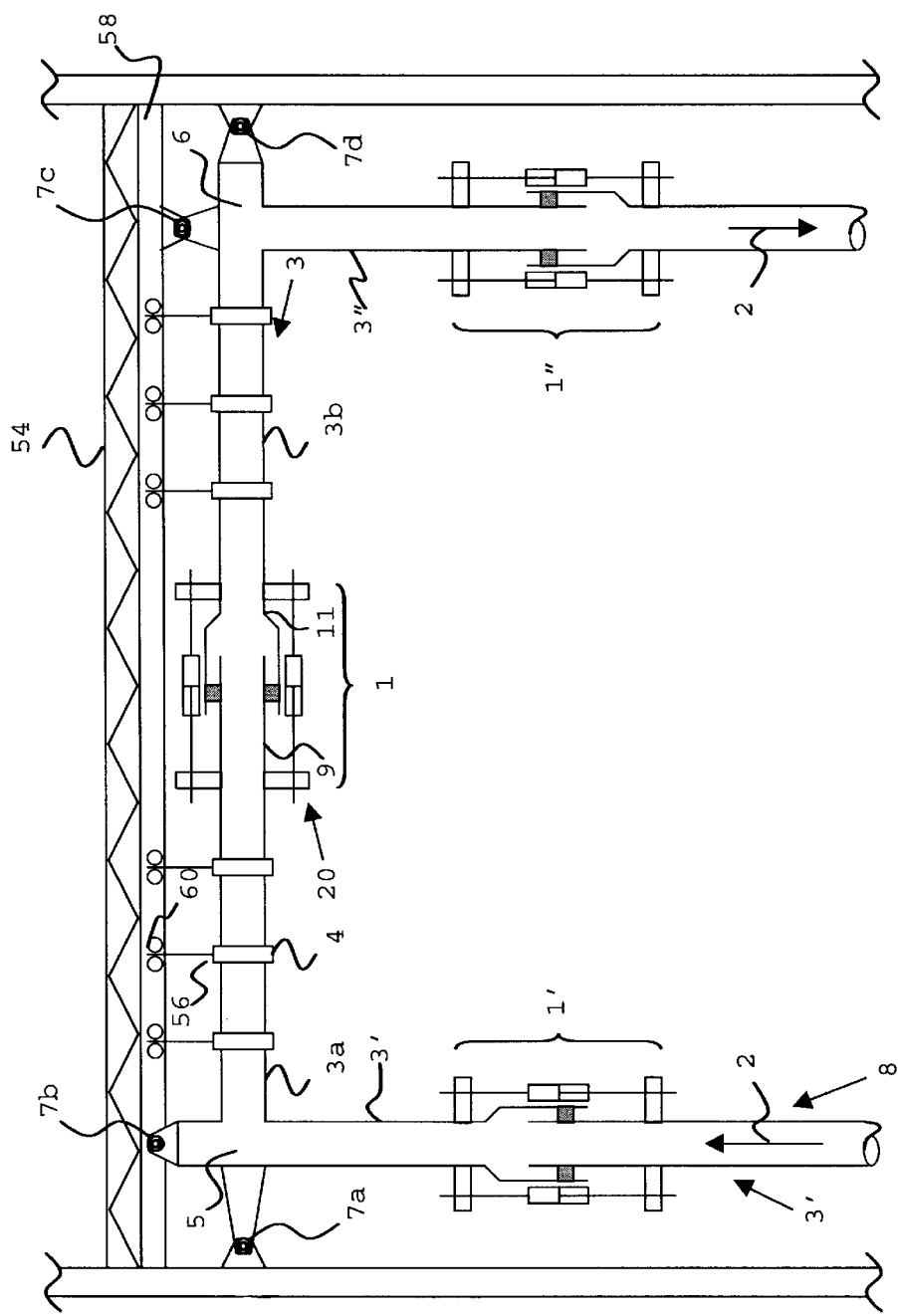
FIG. 1 is a schematic diagram of a preferred embodiment of the present invention illustrating the incorporation of uniquely tensioned expansion joints in vertical and horizontal pipe runs of a large particle pneumatic transport system.
Figure 2:
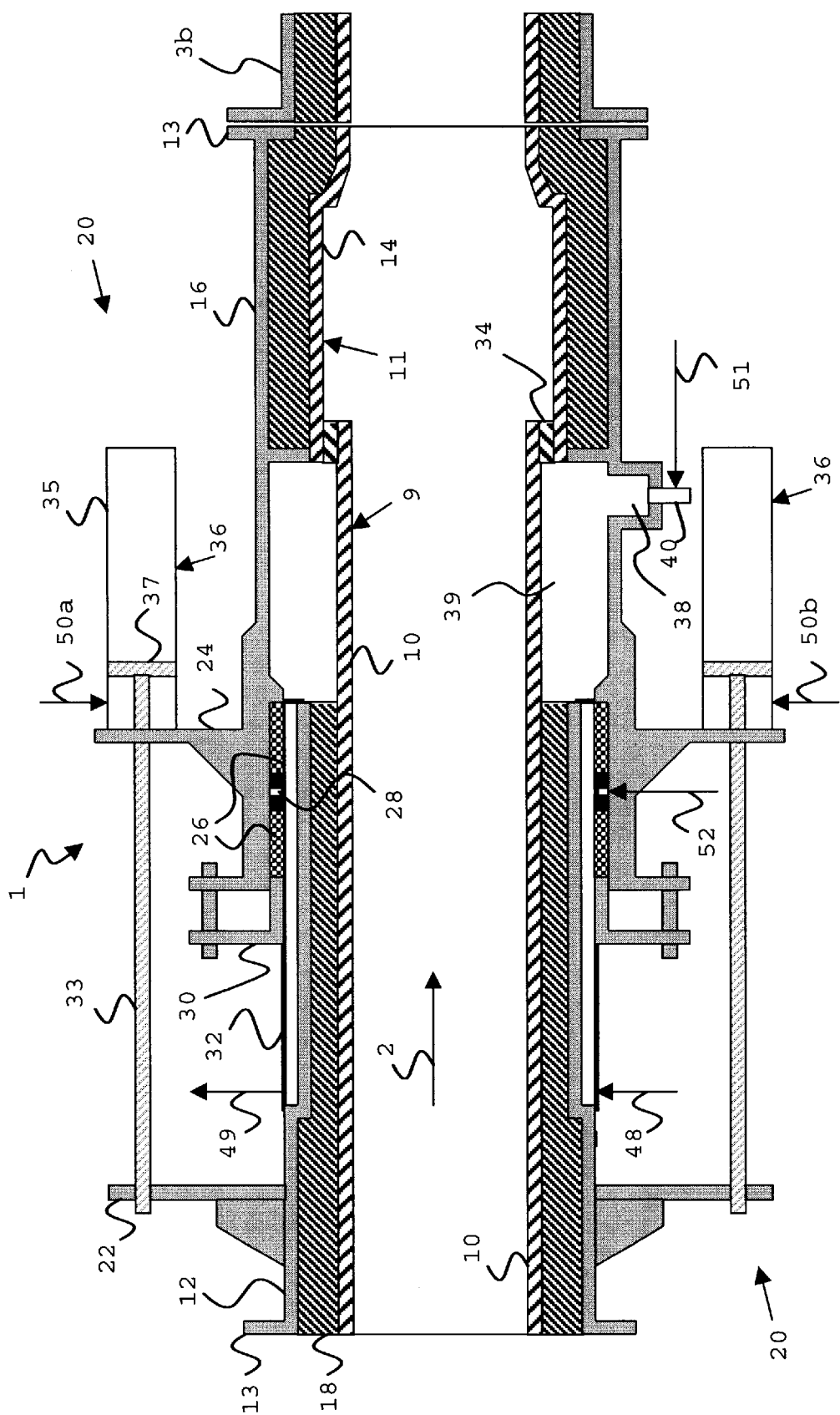
FIG. 2 is a schematic diagram on enlarged scale of a preferred embodiment of one of the improved expansion joints incorporating the tensioning means.
Figure 3:
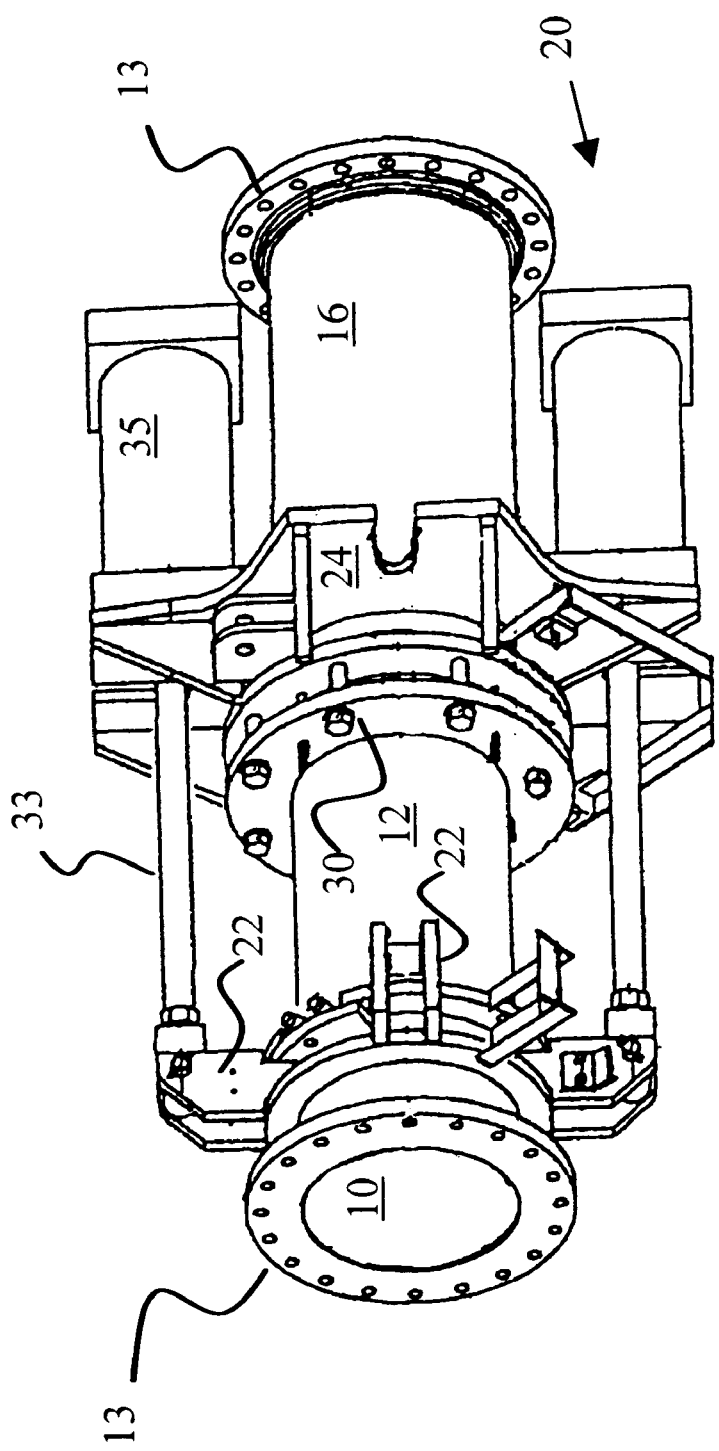
FIG. 3 is an isometric view of the expansion joint of FIG. 2.

FIG. 2 illustrates schematically a horizontal embodiment of the invention where numeral 1 generally designates an expansion joint capable of handling the thermal expansion of the horizontal run 3 of a pneumatic transport pipeline 8. As better seen in FIG. 1, the horizontal portion 3 is formed by at least one expansion joint 1 positioned between co-axial pipe sections 3*a* and 3*b*. Expansion joint 1 also serves to counteract the static friction caused both by movement of pipes 3a and 3b in supports 4 and by the highly compressed packing 26 of the expansion joint itself. Numeral 2 designates the flow of pneumatically transported particles through pipeline 8. The extreme ends of each straight line run (e.g. horizontal run 3) are anchored, such as at anchoring points 7a, 7b, 7c and 7d. The axis of the pipeline 3 between ends 5 and 6 (as well as other straight run portions, such as the upflow pipe 3' or the downflow pipe 3") should be straight in order to avoid excessive abrasion caused by the flow of pneumatically transported DRI particles 2 against misaligned portions of the pipe 3 caused by bending or deformation of the pipes 3a and 3b, etc. The T-junctions at ends 5 and 6 serve to protect from abrasion the pipeline 8 at the right angle turns between straight pipe 3 and its adjacent straight pipe runs 3' and 3" (due to the protective build up of stationary particles in the recesses of the turn, as already explained at the top of column 5 of U.S. Pat. No. 5,296,015). Additional expansion joints 1' and 1" are shown to illustrate that these can be positioned in the vertical upflow and downflow portions of the pipeline, respectively, as well as in the horizontal portion, to achieve the objects of the invention regardless the orientation of the straight line portions of the pipeline 8.

As schematically shown in FIG. 1, the expansion joint 1 is telescopic with its pipe portion 9 overlapped by its pipe portion 11 and with packing 26 stuffed therebetween. When abrasive solid particles are transported, the inner walls 10 and 14 (of portions 9 and 11, respectively) are preferably lined with a wear resistant material in order to avoid rapid wear or abrasion thereof. The pipeline in the illustrated embodiment is to be used at high temperature, and thus the heat losses are required to be minimal. Insulation 18 surrounds the inner walls 10 and 14. In order to protect the insulation layer, respective outer walls 12 and 16 surround the insulation. Suitable flanges 13 can be used to connect corresponding flanges on the adjacent ends of pipes 3a and 3b, or welds can be alternatively used.

Tensioning means 20 on the expansion joint 1 serve to beep the joint's pipe portions 9 and 11 overlapped telescopically and the attached horizontal pipes 3a and 3b tensioned between anchors 7a and 7b sufficiently to maintain alignment and prevent buckling. In this preferred embodiment, tension means 20 are four in number, each positioned 90° from the next and comprising, for example, a fluid drive system 36 having a cylinder 35 and piston 37, which is actuated by a pressurized fluid source 50 to apply a force via the piston device rod 33 between support elements 22 and 24 in order to draw them and the respective pipe portions 9 and 11 on which they are mounted toward each other.

Since the pneumatic transport system usually requires a pressure substantially higher than atmospheric, it is necessary to fit packing 26 between the water jacket 32 of outer wall 12 and the overlapping outer wall 16 (of pipe portions 9 and 11) to prevent a pressure leak of transport gas through the expansion joint 1. Because of the desired high temperatures used in the pneumatic transport of DRI particles, packing 26 can be damaged or even deformed due to said high temperature (as high as 800° C.). To avoid this problem, besides the insulation 18, a cooling jacket 32 is fitted to the outside of outer wall 12 in order to maintain a reasonable temperature below about 80° C. by supplying a cooling fluid 48 flowing through the jacket 32 and exiting through conduit 49. The applicants strongly recommend that the packing 26 be of a type not prone to deformation, because when the expansion joint 1 is subjected to thermal expansion of the pipeline, the highly-compressed packing 26 will have to be able to slide over the cooling jacket 32. A packing press 30 is installed to compress the packing to assure the essentially complete sealing between the outside wall 16 and cooling jacket 32.

When DRI is transported in a pneumatic system, it is necessary to prevent any leak of the transport gas to the atmosphere. As a further precaution to prevent such leakage, inert gas 51 and 52 are injected. The inert gas 51 is applied through the discharge pipe 40 of the dust collector 38 in order to prevent gas leaks and also to provide a higher pressure, which diminishes or avoids the introduction of dust into the cavity 39 provided to permit sliding of the telescopic expansion joint. Also installed to prevent dust from being entrapped into the cavity 39 are dust scrappers 34 were fitted to the inside wall 10, said scrapper 34 removes the dust from the inside wall 14. Inert gas 52 is also injected through a ring 28 in order to provide an inert gas blockage to prevent any possible leak of transport gas past packing 26.

The present invention is the result of overcoming significant difficulties in scale up of the pilot plant structure of U.S. Pat. No. 5,296,015 to an actual highly successful commercial scale installation described herein. In this full scale commercial installation the pipeline 8 is on the order of almost 150 meters long and about ½ meter in diameter, has an upward vertical section 3' of about 50 meters fed with DRI from the output pipe of a direct reduction reactor, has a horizontal section 3 of another 70 meters, and has a downward vertical section 3" of about 5 meters feeding an electric arc furnace. The expansion joint 1 of the commercial installation has an expansion range in length from about 2.5 to 3.2 meters (thus having the capacity to accommodate a 0.7 meter expansion for a 70 meter pipe). Although two such joints 1 were successfully used in the run 3, it has been determined that only one is needed.

In order to maintain the horizontal run of pipe 3 adequately straight, a rigid bridge 54 supports the pipe 3 by means of spaced hangers 56. Each hanger 56 is suspended from a rail 58 mounted on bridge 54. To allow for expansion of the attached pipe 3, the hangers 56 are carried on the rail 58 by rollers 60. Each hanger 56 attaches to a support 4, that directly carries the pipe 3 at a particular spaced point. Support 4 can be a strap, or more preferably will take the form of a frame with rollers that engage and support the pipe 3.

It will be evident for those skilled in the art that the tensioning means 20 can be any other effective drive mechanism, such as counterweights, heavy duty springs (optionally tensioned by electric motors) etc., properly arranged to apply a force equal as that applied by the pneumatic piston shown in FIG. 2 for achieving the same results. It will also be understood by those skilled in the art that numerous other changes can be made to the invention within its scope as defined in the appended claims.

What is claimed is:

1. A method for pneumatic transport of solid abrasive particles at high temperature through at least one straight pipe, comprising:

anchoring the opposite ends of said pipe, maintaining said pipe under constant tension between such anchors by applying a force across at least one expansion joint in said pipe, and conveying said particles from one end to the other end of said tensioned pipe by a carrier gas, said tension being in magnitude at least sufficient to maintain the pipe in straight alignment without buckling of the pipe or sticking of the expansion joint and thereby overcome the separating forces acting on said pipe caused by the pressure of said carrier gas as well as the friction opposing free thermal expansion of said pipe.

2. A method according to claim 1, wherein said expansion joint is formed of telescopically overlapping pipe sections and further comprising sealing the slidable overlap between said pipe sections.

3. A method according to claim 2, wherein said pipe, including most of its expansion joint, has co-axial inner and outer walls spaced by an intermediate layer of insulation.

4. A method according to claim 3, wherein there are a plurality of straight pipes transporting the particles each of which have a respective expansion joint.

5. A method according to claim 4, wherein adjacent straight pipes are joined in pairs by elbows in the form of T-junctions.

6. A method according to claim 3, wherein said straight co-axial pipe is horizontal and is supported at least several spaced points sufficient to aid in maintaining said pipe in straight alignment and in a manner permitting longitudinal movement of the pipe relative to the points of support.

7. A method according to claim 6, wherein the support at said spaced points include rollers for accommodating the longitudinal expansion or contraction of said horizontal.

8. A method according to claim 2, wherein said pressure of said carrier gas is maintained within a range from about 1 kg/cm$^2$ to about 14 Kg/cm$^2$.

9. A method according to claim 8, wherein said carrier gas is a non-oxidizing gas.

10. A method according to claim 9, wherein said carrier gas is at a temperature range between 100° C. and 1000° C.

11. A method according to claim 10, wherein said carrier gas is at a temperature above about 500° C.

12. A method according to claim 11, wherein said solid particles comprises direct reduced iron particles.

13. A method according to claim 12, wherein said tension is applied across said expansion joint by a balanced array of hydraulic motors.

14. A method according to claim 13, wherein said carrier gas is a reducing gas.

* * * * *